(12) United States Patent
Evans et al.

(10) Patent No.: US 9,032,041 B2
(45) Date of Patent: *May 12, 2015

(54) RDMA BASED REAL-TIME VIDEO CLIENT PLAYBACK ARCHITECTURE

(71) Applicant: Qurio Holdings, Inc., Raleigh, NC (US)

(72) Inventors: Gregory M. Evans, Raleigh, NC (US); Thomas A. Roberts, Fuquay-Varina, NC (US); James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,587

(22) Filed: Oct. 1, 2013

(65) Prior Publication Data

US 2014/0033261 A1 Jan. 30, 2014

Related U.S. Application Data

(63) Continuation of application No. 13/178,954, filed on Jul. 8, 2011, now Pat. No. 8,549,091, which is a continuation of application No. 11/831,228, filed on Jul. 31, 2007, now Pat. No. 7,996,482.

(51) Int. Cl.
*G06F 15/167* (2006.01)
*H04N 21/2387* (2011.01)
(Continued)

(52) U.S. Cl.
CPC ............ *H04N 21/2387* (2013.01); *H04L 29/06* (2013.01); *H04L 29/08729* (2013.01); *H04L 65/4084* (2013.01); *H04N 21/23805* (2013.01); *H04N 21/4621* (2013.01)

(58) Field of Classification Search
CPC .................... H04N 21/2387; H04N 21/23805; H04L 29/08729; H04L 29/08549

USPC ......................................................... 709/212
See application file for complete search history.

(56) References Cited

U.S. PATENT DOCUMENTS 5,155,591 A 10/1992 Wachob
5,231,494 A 7/1993 Wachob
(Continued)

FOREIGN PATENT DOCUMENTS

EP 0989722 A1 3/2000
EP 1067792 A2 1/2001
(Continued)

OTHER PUBLICATIONS

Author Unknown, "Advertisement Bidding System and Method", ip.com Prior Art Database, Jun. 15, 2007, copyright 2004, 2 pages, http://www.priorartdatabase.com/IPCOM/000138556, accessed Jun. 15, 2007.
(Continued)

*Primary Examiner* — Razu Miah
(74) *Attorney, Agent, or Firm* — Withrow & Terranova, PLLC (57) ABSTRACT

A client playback architecture for a media content distribution system is provided. In the preferred embodiment, the client playback architecture is a Remote Direct Memory Access (RDMA) based architecture. The RDMA based architecture enables the client playback device to obtain media content from a central server in real-time or in substantially real-time as the media content is needed for playback at the client playback device. More specifically, the playback device includes RDMA enabled playback circuitry operating to perform RDMA transfers for select media content, buffer the media content received as a result of the RDMA transfers, and provide the media content for presentation to one or more associated viewers via one or more audio/video interfaces.

28 Claims, 9 Drawing Sheets

(51) Int. Cl.
*H04L 29/06* (2006.01)
*H04L 29/08* (2006.01)
*H04N 21/238* (2011.01)
*H04N 21/462* (2011.01)

(56) References Cited

U.S. PATENT DOCUMENTS

| | | |
|---|---|---|
| 5,959,623 A | 9/1999 | van Hoff et al. |
| 5,974,398 A | 10/1999 | Hanson et al. |
| 6,128,651 A | 10/2000 | Cezar |
| 6,161,127 A | 12/2000 | Cezar et al. |
| 6,574,793 B1 | 6/2003 | Ngo et al. |
| 6,584,492 B1 | 6/2003 | Cezar et al. |
| 6,697,878 B1 | 2/2004 | Imai |
| 6,698,020 B1 | 2/2004 | Zigmond et al. |
| 6,718,551 B1 | 4/2004 | Swix et al. |
| 6,738,978 B1 | 5/2004 | Hendricks et al. |
| 6,799,326 B2 | 9/2004 | Boylan, III et al. |
| 6,820,277 B1 | 11/2004 | Eldering et al. |
| 6,938,268 B1 | 8/2005 | Hodge |
| 7,039,932 B2 | 5/2006 | Eldering |
| 7,076,530 B2 | 7/2006 | Betz et al. |
| 7,100,183 B2 | 8/2006 | Kunkel et al. |
| 7,134,132 B1 | 11/2006 | Ngo et al. |
| 7,146,627 B1 | 12/2006 | Ismail et al. |
| 7,184,433 B1 | 2/2007 | Oz |
| 7,185,353 B2 | 2/2007 | Schlack |
| 7,228,555 B2 | 6/2007 | Schlack |
| 7,245,614 B1 | 7/2007 | Podar et al. |
| 7,281,030 B1 | 10/2007 | Davis |
| 7,328,450 B2 | 2/2008 | Macrae et al. |
| 7,363,643 B2 | 4/2008 | Drake et al. |
| 7,565,450 B2 | 7/2009 | Garcia-Luna-Aceves et al. |
| 7,571,440 B2 | 8/2009 | Vessey et al. |
| 7,600,037 B2 | 10/2009 | Tucker |
| 7,650,617 B2 | 1/2010 | Hoshino et al. |
| 7,652,594 B2 | 1/2010 | Lamont et al. |
| 7,716,699 B2* | 5/2010 | Evans et al. .................. 725/31 |
| 7,743,112 B2 | 6/2010 | Kenna, III et al. |
| 7,783,773 B2* | 8/2010 | Wu et al. .................. 709/231 |
| 7,882,531 B2 | 2/2011 | Yamagishi |
| 7,996,482 B1 | 8/2011 | Evans et al. |
| 2001/0034763 A1 | 10/2001 | Jacobs et al. |
| 2002/0007413 A1 | 1/2002 | Garcia-Luna-Aceves et al. |
| 2002/0019769 A1 | 2/2002 | Barritz et al. |
| 2002/0023165 A1 | 2/2002 | Lahr |
| 2002/0078444 A1 | 6/2002 | Krewin et al. |
| 2002/0087402 A1 | 7/2002 | Zustak et al. |
| 2002/0087978 A1 | 7/2002 | Nicholson et al. |
| 2002/0095454 A1 | 7/2002 | Reed et al. |
| 2002/0124249 A1 | 9/2002 | Shintani et al. |
| 2002/0124251 A1 | 9/2002 | Hunter et al. |
| 2002/0138291 A1 | 9/2002 | Vaidyanathan et al. |
| 2002/0138440 A1 | 9/2002 | Vaidyanathan et al. |
| 2002/0138831 A1 | 9/2002 | Wachtfogel et al. |
| 2002/0144263 A1 | 10/2002 | Eldering et al. |
| 2002/0161838 A1 | 10/2002 | Pickover et al. |
| 2002/0184403 A1 | 12/2002 | Dahlin et al. |
| 2003/0004793 A1 | 1/2003 | Feuer et al. |
| 2003/0009432 A1 | 1/2003 | Sugahara et al. |
| 2003/0028888 A1 | 2/2003 | Hunter et al. |
| 2003/0036974 A1 | 2/2003 | Allen |
| 2003/0061607 A1 | 3/2003 | Hunter et al. |
| 2003/0065804 A1 | 4/2003 | Owerfeldt et al. |
| 2003/0149975 A1 | 8/2003 | Eldering et al. |
| 2003/0158957 A1* | 8/2003 | Abdolsalehi .................. 709/231 |
| 2003/0165196 A1 | 9/2003 | Demas et al. |
| 2004/0032881 A1 | 2/2004 | Arai |
| 2004/0049600 A1 | 3/2004 | Boyd et al. |
| 2004/0064574 A1* | 4/2004 | Kurauchi .................. 709/231 |
| 2004/0111742 A1 | 6/2004 | Hendricks et al. |
| 2004/0163101 A1 | 8/2004 | Swix et al. |
| 2004/0225719 A1 | 11/2004 | Kisley et al. |
| 2004/0249969 A1* | 12/2004 | Price .................. 709/231 |
| 2004/0261136 A1* | 12/2004 | Aratani et al. .................. 725/151 |
| 2004/0267880 A1 | 12/2004 | Patiejunas |
| 2004/0267952 A1* | 12/2004 | He et al. .................. 709/231 |
| 2005/0036555 A1 | 2/2005 | Ramakrishnan |
| 2005/0039205 A1 | 2/2005 | Riedl |
| 2005/0091160 A1 | 4/2005 | Kitze et al. |
| 2005/0097183 A1 | 5/2005 | Westrelin |
| 2005/0108776 A1 | 5/2005 | Carver et al. |
| 2005/0160470 A1* | 7/2005 | Strauss .................. 725/115 |
| 2005/0232304 A1 | 10/2005 | Quigley |
| 2005/0251820 A1 | 11/2005 | Stefanik et al. |
| 2005/0259947 A1* | 11/2005 | Wang et al. .................. 386/46 |
| 2006/0036490 A1 | 2/2006 | Sagalyn |
| 2006/0059042 A1 | 3/2006 | Zohar |
| 2006/0059048 A1 | 3/2006 | Frentzel-Beyme et al. |
| 2006/0059242 A1* | 3/2006 | Blackmore et al. .................. 709/211 |
| 2006/0075057 A1 | 4/2006 | Gildea et al. |
| 2006/0095507 A1 | 5/2006 | Watson |
| 2006/0107187 A1* | 5/2006 | Hannuksela .................. 714/776 |
| 2006/0107302 A1 | 5/2006 | Zdepski |
| 2006/0110552 A1 | 5/2006 | Ishida et al. |
| 2006/0168616 A1 | 7/2006 | Candelore |
| 2006/0212900 A1 | 9/2006 | Ismail et al. |
| 2006/0224761 A1 | 10/2006 | Howarth et al. |
| 2006/0230119 A1 | 10/2006 | Hausauer et al. |
| 2006/0294555 A1 | 12/2006 | Xie |
| 2007/0011702 A1 | 1/2007 | Vaysman |
| 2007/0027755 A1 | 2/2007 | Lee |
| 2007/0028261 A1 | 2/2007 | Bouilloux-Lafont |
| 2007/0058670 A1 | 3/2007 | Konduru et al. |
| 2007/0065122 A1* | 3/2007 | Chatterton .................. 386/126 |
| 2007/0112971 A1 | 5/2007 | Noff et al. |
| 2007/0136488 A1* | 6/2007 | Cho et al. .................. 709/231 |
| 2007/0136522 A1* | 6/2007 | Umemura et al. .................. 711/113 |
| 2007/0136778 A1* | 6/2007 | Birger et al. .................. 725/117 |
| 2007/0214480 A1 | 9/2007 | Kamen |
| 2007/0265974 A1 | 11/2007 | Chang |
| 2008/0063005 A1* | 3/2008 | Roos et al. .................. 370/432 |
| 2008/0127245 A1 | 5/2008 | Olds |
| 2008/0189412 A1* | 8/2008 | Wang et al. .................. 709/224 |
| 2008/0240673 A1* | 10/2008 | Ugawa et al. .................. 386/55 |
| 2008/0288556 A1 | 11/2008 | O'Krafka et al. |
| 2008/0301311 A1 | 12/2008 | Bestler |
| 2009/0102969 A1* | 4/2009 | Knutson et al. .................. 348/471 |
| 2009/0178090 A1* | 7/2009 | Oztaskent .................. 725/90 |
| 2013/0117621 A1 | 5/2013 | Saraiya et al. |

FOREIGN PATENT DOCUMENTS

| | | |
|---|---|---|
| EP | 1162840 A2 | 12/2001 |
| EP | 1418514 A1 | 5/2004 |
| EP | 1524602 A2 | 4/2005 |
| EP | 1528478 A1 | 5/2005 |
| WO | 9905584 A2 | 2/1999 |
| WO | 9952285 A1 | 10/1999 |
| WO | 0014951 A1 | 3/2000 |
| WO | 0147156 A2 | 6/2001 |
| WO | 0171524 A1 | 9/2001 |
| WO | 0219581 A1 | 3/2002 |
| WO | 0245430 A2 | 6/2002 |
| WO | 0254754 A2 | 7/2002 |
| WO | 03053056 A1 | 6/2003 |

OTHER PUBLICATIONS

Author Unknown, "PacketCable TM 2.0: Codec and Media Specification, PKT-SP-Codec-Media-I02-061013," CableLabs, Oct. 13, 2006, 89 pages, http://www.packetcable.com/downloads/specs/PKT-SP-CODEC-MEDIA-I02-061013.pdf.

Author Unknown, "SnapStream: PC DVR and TV Tuner Software," SnapStream Media, http://www.snapstream.com, accessed on Jun. 15, 2007, 1 page.

Author Unknown, "Squid cache—Wikipedia, the free encyclopedia," Wikipedia, http://en.wikipedia.org/wiki/Squid_cache, accessed on Jun. 15, 2007, 3 pages.

Bailey, S., et al., "The Architecture of Direct Data Placement (DDP) and Remote Direct Memory Access (RDMA) on Internet Protocols," Request for Comments (RFC) 4296, Network Working Group, (56) References Cited

OTHER PUBLICATIONS

Internet Engineering Task Force, Dec. 2005, 21 pages, http://www.ietf.org/rfc/rfc4296.txt.

Cain, B., et al., "Internet Group Management Protocol, Version 3," Request for Comments (RFC) 3376, Network Working Group, Internet Engineering Task Force, Oct. 2002, 50 pages, http://www.ietf.org/rfc/rfc3376.txt.

Deering, S., et al., "Internet Protocol, Version 6 (IPv6) Specification," Request for Comments (RFC) 2460, Network Working Group, Internet Engineering Task Force, Dec. 1998, 37 pages, http://www.ietf.org/rfc/rfc2460.txt.

Gwertzman, James et al., "An Analysis of Geographical Push-Caching," World Wide Web Research, Mar. 18, 1997, 20 pages, http://www.eecs.harvard.edu/~vino/web/.

Hilland, Jeff et al., "RDMA Protocol Verbs Specification (Version 1.0)," Apr. 2003, 242 pages, http://www.rdmaconsortium.org.

Pinkerton, Jim, "The Case for RDMA," PowerPoint presentation, RDMA Consortium, May 29, 2002, 27 pages, http://www.rdmaconsortium.org/home/The_Case_for_RDMA020531.pdf.

Postel, J. (ed), "Internet Protocol: DARPA Internet Program Protocol Specification," Request for Comments (RFC) 791, Information Sciences Institute, Sep. 1981, 49 pages, http://www.ietf.org/rfc/rfc791.txt.

Postel, J., "User Datagram Protocol," Request for Comments (RFC) 768, Aug. 28, 1980, 3 pages, http://www.ietf.org/rfc/rfc768.txt.

Recio, R., et al., "A Remote Direct Memory Access Protocol Specification," Internet Draft, Internet Engineering Task Force (IETF) Remote Direct Data Placement Work Group, Sep. 8, 2006, 82 pages, http://www.ietf.org/internet-drafts/draft-ietf-rddp-rdmap-07.txt.

Recio, R., et al., "An RDMA Protocol Specification (Version 1.0)," Oct. 2002, 60 pages, http://www.rdmaconsortium.org/home/draft-recio-iwarp-rdmap-v1.0.pdf.

Romanow, A., et al., "Remote Direct Memory Access (RDMA) over IP Problem Statement," Request for Comments (RFC) 4297, Network Working Group, Internet Engineering Task Force, Dec. 2005, 19 pages, http://www.ietf.org/rfc/rfc4297.txt.

Schulzrinne, H., et al., "Real Time Streaming Protocol (RTSP)," Request for Comments (RFC) 2326, Network Working Group, Internet Engineering Task Force, Apr. 1998, 86 pages, http://www.ietf.org/rfc/rfc2326.txt.

Schulzrinne, H., et al., "RTP: A Transport Protocol for Real-Time Applications," Request for Comments (RFC) 3550, Network Working Group, Internet Engineering Task Force, Jul. 2003, 98 pages, http://www.ietf.org/rfc/rfc3550.txt.

Shah, Hemal et al., "Direct Data Placement over Reliable Transports (Version 1.0)," Oct. 2002, 35 pages, http://www.rdmaconsortium.org/home/draft-shah-iwarp-ddp-v1.0.pdf.

Author Unknown, "Internet Cache Protocol—Wikipedia, the free encyclopedia," Wikipedia, http://en.wikipedia.org/wiki/Internet_Cache_Protocol, accessed on Jun. 15, 2007, 2 pages.

Author Unknown, "ITU Publications: Welcome," International Telecommunication Union, http://www.itu.int/publications/default.aspx, accessed on Jun. 26, 2008, 1 page.

Wenger, S., et al., "RTP Payload Format for H.264 Video," Request for Comments (RFC) 3984, Network Working Group, Internet Engineering Task Force, Feb. 2005, 65 pages, http://www.ietf.org/rfc/rfc3984.txt.

International Search Report and Written Opinion for PCT/US08/66010, mailed Aug. 20, 2008, 11 pages.

International Search Report and Written Opinion for PCT/US08/66245, mailed Sep. 4, 2008, 11 pages.

Pre-Interview Communication for U.S. Appl. No. 11/831,228, mailed Apr. 1, 2010, 19 pages.

Notice of Allowance for U.S. Appl. No. 11/831,228, mailed Jul. 21, 2010, 9 pages.

Notice of Allowance for U.S. Appl. No. 11/831,228, mailed Mar. 31, 2011, 12 pages.

Non-Final Office Action for U.S. Appl. No. 13/178,954, mailed Jan. 3, 2013, 10 pages.

Notice of Allowance for U.S. Appl. No. 13/178,954, mailed May 28, 2013, 8 pages.

Third Office Action for Chinese Patent Application No. 200880019901.8, issued Jan. 20, 2015, 21 pages (with English translation).

* cited by examiner

RDMA BASED REAL-TIME VIDEO CLIENT PLAYBACK ARCHITECTURE

RELATED APPLICATIONS

This patent application claims priority to and is a continuation of co-pending U.S. patent application Ser. No. 13/178,954, entitled "RDMA BASED REAL-TIME VIDEO CLIENT PLAYBACK ARCHITECTURE," filed on Jul. 8, 2011, which claims priority to and is a continuation of U.S. patent application Ser. No. 11/831,228, entitled "RDMA BASED REAL-TIME VIDEO CLIENT PLAYBACK ARCHITECTURE," filed on Jul. 31, 2007, now U.S. Pat. No. 7,996,482, the disclosures of each of which are hereby incorporated herein by reference in their entireties.

TECHNICAL FIELD

The present invention relates to a media content distribution system and more particularly relates to an architecture for a client playback device in a media content distribution system.

BACKGROUND

Many new and novel systems are emerging for narrowcasting of advertisements in media distribution systems such as, for example, digital television distribution systems. As a result of narrowcasting advertisements, higher levels of advertisement-based revenue can be obtained. However as narrowcast becomes more targeted and the number of users in the system grows, current centralized media content distribution systems do not efficiently scale for cost, size, and power. Thus, new architectures are needed to allow real-time late-binding of advertisements while minimizing loading on these centralized media content distribution systems.

SUMMARY

The present invention provides a client playback architecture for a media content distribution system. In the preferred embodiment, the client architecture is a Remote Direct Memory Access (RDMA) based architecture. The RDMA based architecture enables the client playback device to obtain media content from a central server in real-time or in substantially real-time as the media content is needed for playback at the client playback device. More specifically, the playback device includes RDMA enabled playback circuitry operating to perform RDMA transfers for select media content, buffer the media content received as a result of the RDMA transfers, and provide the media content for presentation to one or more associated viewers via one or more audio/video interfaces.

In one embodiment, the RDMA playback circuitry includes an array of RDMA enabled buffers, an array of playback buffers, and switching circuitry interconnecting the array of RDMA enabled buffers to the array of playback buffers. In operation, when playback of select media content is desired, RDMA is utilized to transfer the select media content to a corresponding RDMA enabled buffer. As the select media content is being transferred to the RDMA enabled buffer, the media content is transferred to a desired playback buffer via the switching circuitry according to a playback clock. The playback buffer stores and optionally processes the media content for presentation to one or more associated viewers via an associated interface.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
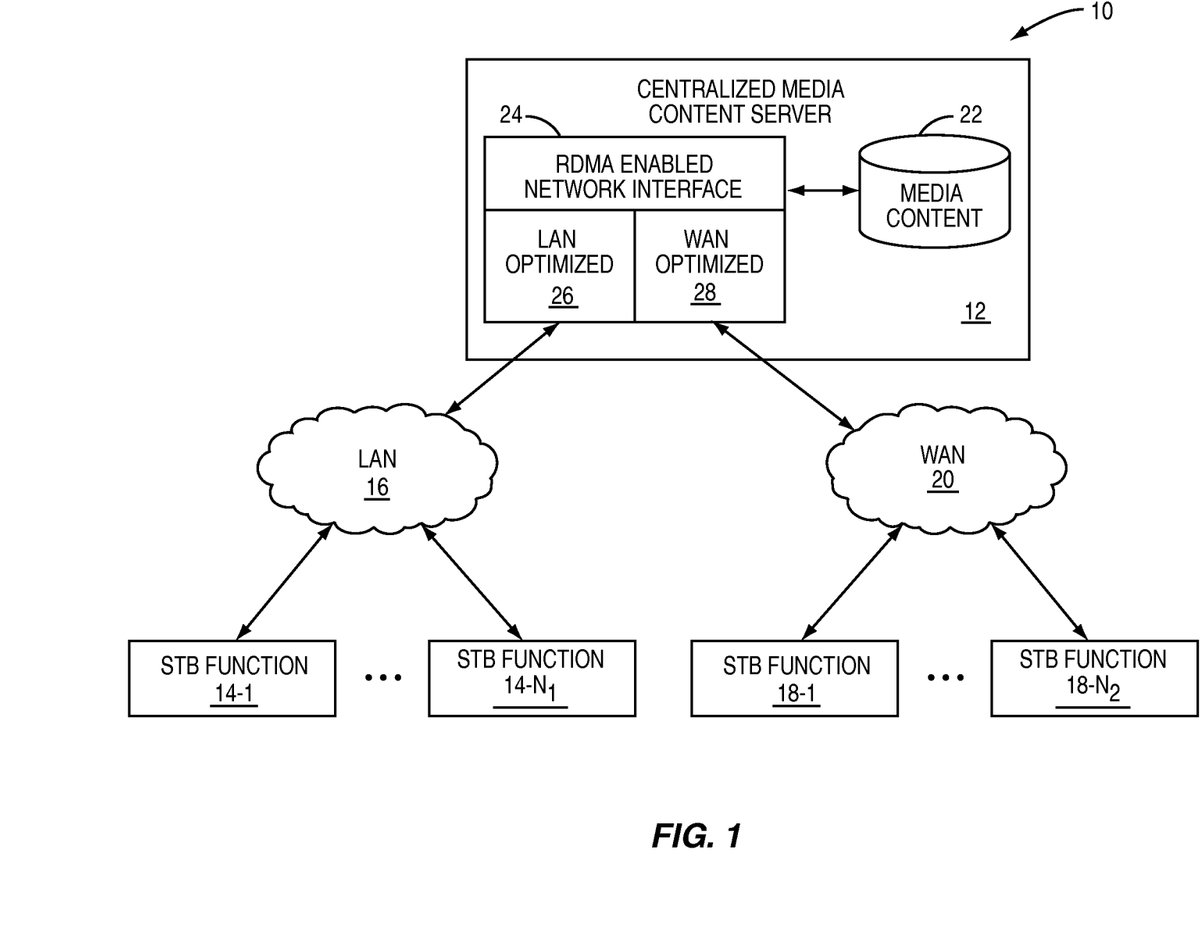
FIG. 1 illustrates a media content delivery system 10 incorporating a Remote Direct Memory Access (RDMA) enabled client architecture according to one embodiment of the present invention.

FIG. 1 illustrates a media content delivery system 10 incorporating a Remote Direct Memory Access (RDMA) enabled client architecture according to one embodiment of the present invention. Note that while RDMA is discussed herein as the preferred embodiment, the present invention is not limited thereto. Further, as used herein, "RDMA" is not necessarily any particular RDMA protocol but is rather any digital content transfer scheme enabling transfer of digital content from the memory or other digital storage unit of one device to the memory or other digital storage unit of another device via a network with minimal or no Central Processing Unit (CPU) and/or operating system utilization.

In general, the system 10 includes a centralized media content server 12 interconnected to a number of set-top box (STB) functions 14-1 through 14-$N_1$ via a network 16, which in this example is a Local Area Network (LAN) 16. The LAN 16 may be any type of wired and/or wireless LAN. In one embodiment, the LAN 16 provides a 10 Gigabits per second (Gbps) or higher transfer rate using InfiniBand (IB) or some other RDMA enabled protocol. The centralized media content server 12 may additionally or alternatively be interconnected to a number of STB functions 18-1 through 18-N$_2$ via a network 20, which in this example is a Wide Area Network (WAN) 20. The WAN 20 may be wired, wireless, or a combination thereof. In one embodiment, the WAN 20 is an optical network providing a 10 Gbps or higher transfer rate. RDMA over Transfer Control Protocol/Internet Protocol (TCP/IP), or iWARP, may be used in the protocol stack to provide reliable transport of RDMA traffic over the WAN 20. Note that, preferably, the centralized media content server 12 serves only the STB functions 14-1 through 14-N$_1$ via the LAN 16 or the STB functions 18-1 through 18-N$_2$ via the WAN 20. In the case of the STB functions 14-1 through 14-N$_1$, the centralized media content server 12 is preferably a server located on the same premises as the STB functions 14-1 through 14-N$_1$. For example, the centralized media content server 12 and the STB functions 14-1 through 14-N$_1$ may be located in a particular user's home. In the case of the STB functions 18-1 through 18-N$_2$, the centralized media content server 12 may be located at, for example, a headend of a video distribution network.

The STB functions 14-1 through 14-N$_1$ and 18-1 through 18-N$_2$ may alternatively be referred to herein as client devices. Each of the STB functions 14-1 through 14-N$_1$ and 18-1 through 18-N$_2$ may be, for example, a set-top box similar to those used in traditional digital television delivery systems, a component of a set-top box, a personal computer, a component of a personal computer, a portable media player similar to an iPod®, a mobile telephone, a Personal Digital Assistant (PDA), or the like. As discussed below, the STB functions 14-1 through 14-N$_1$ and 18-1 through 18-N$_2$ incorporate RDMA enabled playback functions which enable the STB functions 14-1 through 14-N$_1$ and 18-1 through 18-N$_2$ to utilize RDMA to obtain desired media content from the centralized media content server 12.

The centralized media content server 12 hosts media content 22. The media content may include, for example, video content such as movies, television programs, or video clips; audio content such as songs or radio programs; streaming video content such as broadcast television channels or IPTV channels; streaming audio content such as broadcast radio stations; advertisement content; or the like, or any combination thereof. The centralized media content server 12 also includes an RDMA enabled network interface 24. In the illustrated embodiment, the RDMA enabled network interface 24 includes a LAN optimized protocol stack 26 and/or a WAN optimized protocol stack 28. The LAN optimized protocol stack 26 may use the IB protocol or similar RDMA enabled protocol to carry RDMA traffic over the LAN 16. The WAN optimized protocol stack 28 may use RDMA over TCP/IP or similar RDMA enabled protocol to carry RDMA traffic over the WAN 20.

Figure 2:
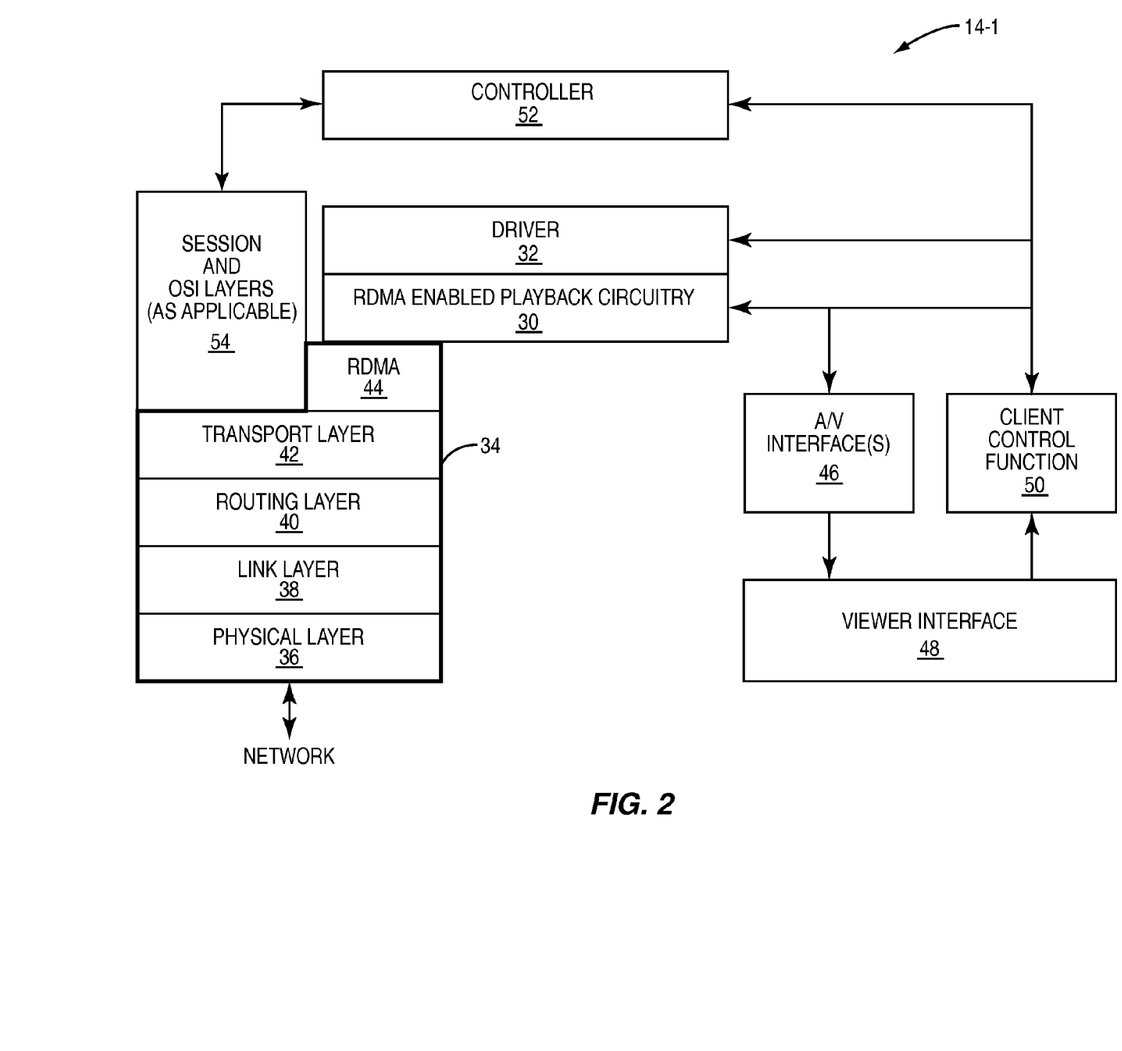
FIG. 2 illustrates an exemplary RDMA client architecture according to one embodiment of the present invention.

FIG. 2 is a functional block diagram of the STB function 14-1 of FIG. 1. This discussion is equally applicable to the other STB functions 14-2 through 14-N$_1$ and 18-1 through 18-N$_2$. The STB function 14-1 includes RDMA enabled playback circuitry 30 and a driver function 32 for controlling the RDMA enabled playback circuitry 30. The RDMA enabled playback circuitry 30 is preferably implemented in hardware. For example, the RDMA enabled playback circuitry 30 may be implemented in one or more Field Programmable Gate Arrays (FPGAs), one or more Application Specific Integrated Circuits (ASICs), or the like. The driver 32 may be implemented in hardware, software, or a combination thereof.

As discussed below in detail, under the control of the driver 32, the RDMA enabled playback circuitry 30 operates to effect RDMA transfers of select media content from the centralized media content server 12 (FIG. 1) to the STB function 14-1 via an RDMA enabled network interface 34. The RDMA enabled network interface 34 includes a physical layer 36, a link layer 38, a routing layer 40, a transport layer 42, and an RDMA layer 44. The physical layer 36, the link layer 38, the routing layer 40, and the transport layer 42 are similar to those in traditional network interfaces. For example, the layers 36-42 may be the same as those in any industry complaint LAN based network interface card (NIC). Note that if the LAN 16 or WAN 20 is a Cable Television (CATV) network, the layers 36-42 may be a Data Over Cable Services Interface Specifications (DOCSIS) based protocol stack or a LAN/WAN protocol stack located inside a DOCSIS based modem or firewall.

The RDMA enabled playback circuitry 30 also operates to output the received video content using one or more audio/video (A/V) interfaces 46 for presentation to one or more associated users via a viewer interface 48. The A/V interfaces 46 may include, for example, a High Definition Multimedia Interface (HDMI) with or without High-bandwidth Digital Content Protection (HDCP) or similar Digital Rights Management (DRM) technology, a Digital Video Interface (DVI), a component video interface, an S-Video interface, a component A/V interface, or the like, or any combination thereof. The viewer interface 48 may be, for example, a television or other display, a sound system, or the like, or a combination thereof. While the viewer interface 48 is illustrated as part of the STB function 14-1, the present invention is not limited thereto. The viewer interface 48 may alternatively be a separate device.

In this example, the viewer interface 48 also includes one or more user input components such as, for example, input buttons or dials, a keypad, a wireless remote control, or the like. As such, the STB function 14-1 may also include a client control function 50 operating to receive inputs from the one or more associated users and to either: (1) pass the user inputs to the RDMA enabled playback circuitry 30, the driver 32, the A/V interface 46, a controller 52 of the STB function 14-1, or any combination thereof or (2) process the user inputs and control one or more of the RDMA enabled playback circuitry 30, the driver 32, the A/V interface 46, and the controller 52 based on the user inputs. For example, the client control function 50 may receive user inputs such as content selection inputs and playback control inputs such as pause, fast-forward, rewind, or the like. Upon receiving a content selection input, the client control function 50 may either provide the content selection input to the driver 32 or control the driver 32 to initiate playback of the selected media content. Similarly, upon receiving a playback control input, the client control function 50 may either provide the playback control input to the driver 32 and/or the RDMA enabled playback circuitry 30 or control the driver 32 and/or the RDMA enabled playback circuitry 30 according to the playback control input.

The controller 52 may be used to perform various functions. For example, in one embodiment, the centralized media content server 12 (FIG. 1) publishes a mapping providing RDMA address ranges for all or at least a portion of the media content items hosted by the centralized media content server 12. The mapping may also include metadata describing the media content items such as, for example, titles, content type, genre, and the like, or any combination thereof. The controller 52 may operate to receive or otherwise obtain the mapping from the centralized media content server 12 via the RDMA enabled network interface 34. Note that, as illustrated, the controller 52 is connected to the LAN 16 via the layers 36-42 of the RDMA enabled network interface 34 and, optionally, one or more session and/or Open Systems Interconnection (OSI) layers 54. The controller 52 may perform other functions such as, for example, effecting presentation of an Electronic Programming Guide (EPG), menus, or the like to the one or more associated users via the A/V interface 46 to enable the one or more associated users to select media content for playback.

Figure 3:
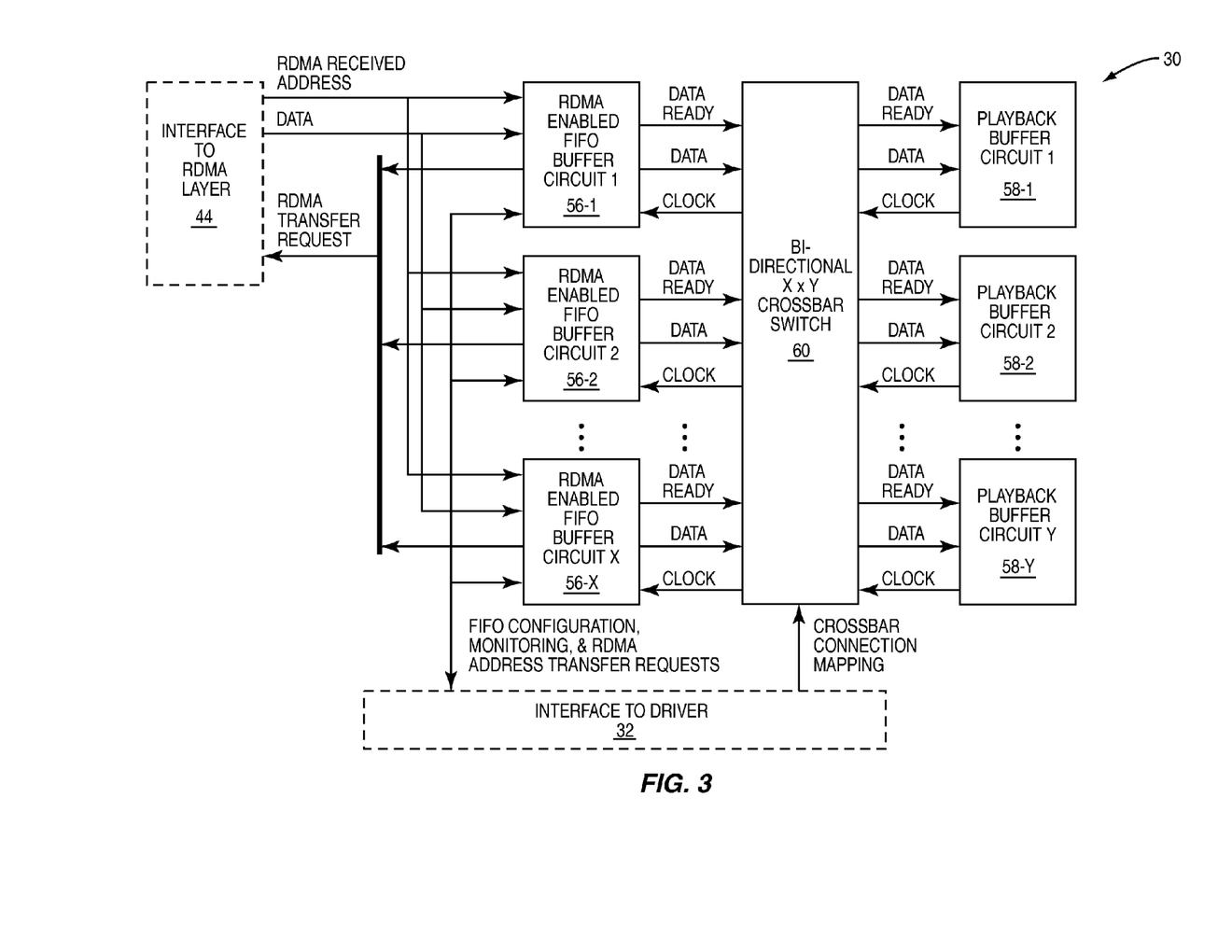
FIG. 3 is a block diagram of the RDMA enabled playback circuitry of FIG. 2 according to one embodiment of the present invention.

FIG. 3 is a block diagram of the RDMA enabled playback circuitry 30 of FIG. 2 according to one embodiment of the present invention. In this embodiment, the RDMA enabled playback circuitry 30 includes an array of RDMA enabled First-In-First-Out (FIFO) buffer circuits 56-1 through 56-X and an array of playback buffer circuits 58-1 through 58-Y interconnected by a bi-directional crossbar switch 60 to form a two-stage buffering architecture. Both the array of RDMA enabled FIFO buffer circuits 56-1 through 56-X and the array of playback buffer circuits 58-1 through 58-Y are scalable, where the number of RDMA enabled FIFO buffer circuits 56-1 through 56-Y and the number of playback buffer circuits 58-1 through 58-Y depend on the particular implementation.

As one example of the use of the array of RDMA enabled FIFO buffer circuits 56-1 through 56-X, the STB function 14-1 may perform late-binding of targeted advertisements to select video content. More specifically, upon receiving a content selection from the user, the driver 32 may assign the RDMA enabled FIFO buffer 56-1 to obtain the selected video content and assign the RDMA enabled FIFO buffer 56-2 to obtain targeted advertisements to be inserted into the selected video content during playback. Assuming, for example, that the select video content is being presented to the viewer via the playback buffer circuit 58-1, the driver 32 controls the crossbar switch 60 such that the playback buffer circuit 58-1 is connected to the RDMA enabled FIFO buffer circuit 56-1 during playback of the select video content and is switched to the RDMA enabled FIFO buffer circuit 56-2 to present the targeted advertisements during advertisement (ad) slots. For more information regarding an exemplary late-binding method for a central or remote headend of a video distribution system that may be used to perform late-binding in the STB function 14-1, the interested reader is directed to U.S. patent application Ser. No. 11/685,479, entitled LATE-BINDING OF ADVERTISEMENTS USING RDMA CONNECTIVITY, filed on Mar. 13, 2007 and U.S. patent application Ser. No. 11/760,013, entitled MULTI-CLIENT STREAMER WITH LATE BINDING OF AD CONTENT, filed on Jun. 8, 2007, both of which are hereby incorporated herein by reference in their entireties.

As another example of the use of the array of RDMA enabled FIFO buffer circuits 56-1 through 56-X, the STB function 14-1 may utilize multiple RDMA enabled FIFO buffer circuits 56-1, 56-X to provide a Picture-In-Picture (PIP) feature or to otherwise present multiple media content items simultaneously.

Figure 4:
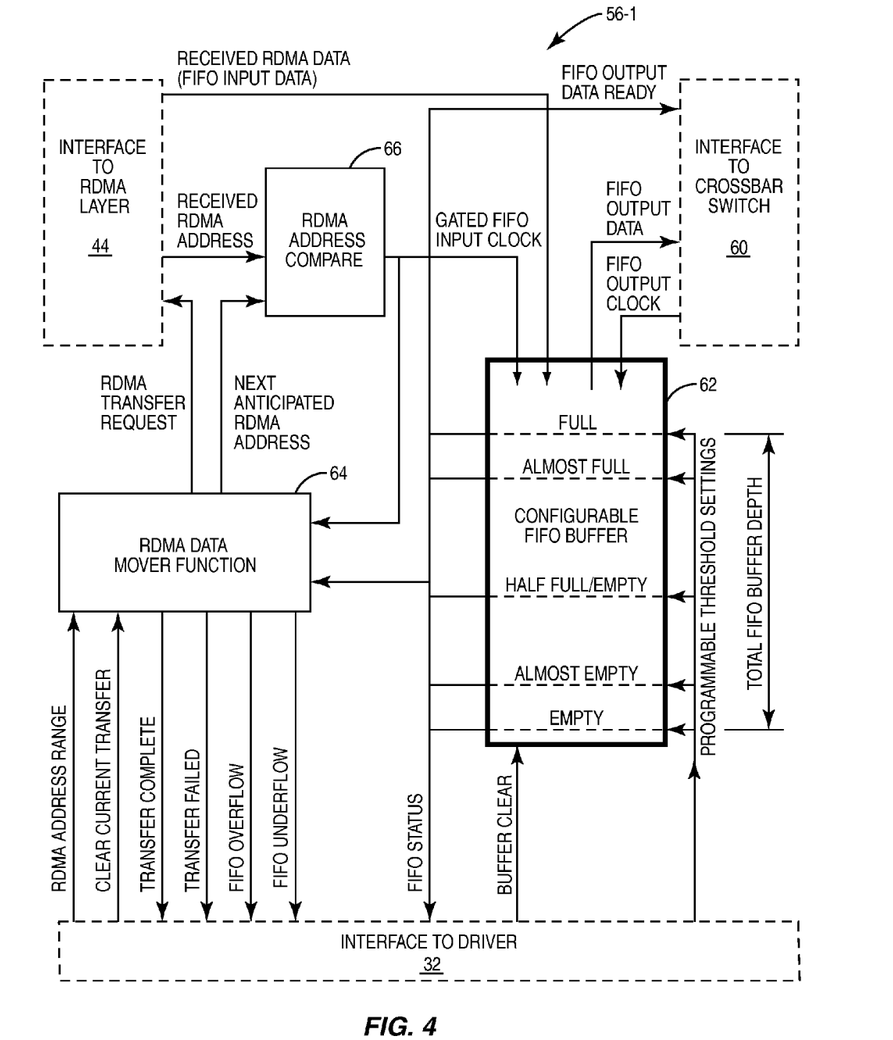
FIG. 4 is a block diagram of one of the RDMA enabled First-In-First-Out (FIFO) buffer circuits of FIG. 3 according to one embodiment of the present invention.

FIG. 4 is a block diagram of the RDMA enabled FIFO buffer circuit 56-1 according to one embodiment of the present invention. This discussion is equally applicable to the other RDMA enabled FIFO buffer circuits 56-2 through 56-X. The RDMA enabled FIFO buffer circuit 56-1 includes a FIFO buffer 62, an RDMA data mover function 64, and an RDMA address compare function 66. The FIFO buffer 62 may be implemented in any type of memory and, in this embodiment, has a number of programmable threshold settings. In this example, the FIFO buffer 62 has an "empty" threshold setting, an "almost empty" threshold setting, a "half full" threshold setting, a "half empty" threshold setting which typically corresponds to the half full threshold setting, an "almost full" threshold setting, and a "full" threshold setting. The FIFO buffer 62 provides a FIFO status output that is indicative of the status of the FIFO buffer 62. More specifically, the FIFO status output is in an "empty" state when the FIFO buffer 62 is empty, in an "almost empty" state when the amount of data stored in the FIFO buffer 62 is less than or equal to the almost empty threshold setting, in a "half empty" state when the amount of data stored in the FIFO buffer 62 is less than or equal to the half empty threshold setting but greater than the almost empty threshold setting, in a "half full" state when the amount of data stored in the FIFO buffer 62 is greater than the half full threshold setting but less than the almost full threshold setting, in an "almost full" state when the amount of data stored in the FIFO buffer 62 is greater than the almost full threshold setting, and a "full" state when the FIFO buffer is full. In this example, the FIFO status is provided to the playback buffer circuit 58-1, 58-Y to which the FIFO buffer 62 is connected via the crossbar switch 60 as a FIFO output data ready signal.

In operation, when media content is selected for playback, the driver 32 identifies an RDMA address range for the selected media content at the centralized media content server 12 from, for example, the mapping published by the centralized media content server 12. The driver 32 then provides the RDMA address range to the RDMA data mover function 64 of the RDMA enabled FIFO buffer circuit 56-1, which has been allocated for the selected media content by, for example, the controller 52. Upon receiving the RDMA address range, the RDMA data mover function 64 generally operates to determine the available space in the FIFO buffer 62 and generates an RDMA transfer request for at least a segment of the RDMA address range based on the available space in the FIFO buffer 62. The RDMA data mover function 64 then provides the RDMA transfer request to the RDMA layer 44 (FIG. 2) of the RDMA enabled network interface 34 (FIG. 2).

Thereafter, as data is received from the RDMA layer 44, the RDMA address compare function 66 compares an address of the received data ("Received RDMA address") to a next anticipated RDMA address to determine whether the received data is data received in response to the RDMA transfer request of the RDMA data mover function 64. This is important where more than one of the RDMA enabled FIFO buffer circuits 56-1 through 56-X have issued concurrent RDMA transfer requests. By comparing the RDMA address of the received data to the next anticipated RDMA address for the issued RDMA transfer request, the RDMA address compare function 66 ensures that only the requested data is clocked into the FIFO buffer 62. If the RDMA address of the received data is the next anticipated RDMA address, the RDMA address compare function 66 toggles a gated FIFO input clock provided to the FIFO buffer 62 to clock the received data into the FIFO buffer 62. The data may be clocked in as a bit, byte, word, or other format appropriate to the RDMA enabled network interface 34 and the FIFO buffer 62. The RDMA data mover function 64 then increments the next anticipated RDMA address, and the process continues until all of the requested data is stored in the FIFO buffer 62.

Note that, in an alternative embodiment, the data received from the RDMA layer 44 is a block of data from a block of RDMA addresses. Thus, additional circuitry may be used within or around the RDMA address compare function 66 to correctly clock the data into the FIFO buffer 62. Also, additional circuitry may be used to increment the next anticipated RDMA address value in response to receiving data for a block of RDMA addresses rather than receiving data for each RDMA address separately.

Once all of the data for the RDMA transfer request has been received, the RDMA data mover function 64 monitors the FIFO buffer 62 to determine when at least a threshold amount of space is available before issuing the next RDMA transfer request, if any, for the selected media content. The threshold amount may be, for example, when the status of the FIFO buffer 62 is equal to or less than almost full. If the threshold amount of space is available, the RDMA data mover function 64 generates an RDMA transfer request for a next segment of the address range for the selected media content item. From this point, the process continues until the data for the entire RDMA address range has been transferred to the FIFO buffer 62. Once the transfer is complete, the RDMA data mover function 64 provides a "transfer complete" signal to the driver 32. Note that the RDMA data mover function 64 may provide feedback to the driver 32 if the transfer failed, if a FIFO overflow condition exists, or if a FIFO underflow condition exists. If the transfer fails or if playback of the selected media content is terminated, the driver 32 may instruct the RDMA data mover function 64 to clear the current transfer and clear the FIFO buffer 62.

While the data corresponding to the selected media content item is being transferred to the FIFO buffer 62, the data is also being clocked out of the FIFO buffer 62 by a FIFO output clock. As discussed below, the FIFO output clock is a streaming video playback clock provided by the playback buffer circuit 58-1, 58-Y (FIG. 3) to which the RDMA enabled FIFO buffer circuit 56-1 is connected by the crossbar switch 60. In this example, assume that the RDMA enabled FIFO buffer circuit 56-1 is connected to the playback buffer circuit 58-1. The streaming video clock of the playback buffer circuit 58-1 is controlled such that the data is transferred from the FIFO buffer 62 to the playback buffer circuit 58-1 at a rate desired for playback. Thus, for example, if the viewer pauses playback, the streaming video clock is controlled such that data is not clocked out of the FIFO buffer 62. However, as a result of the two-stage buffer architecture of the RDMA enabled playback circuitry 30, data continues to be transferred to the FIFO buffer 62 regardless of the state of the streaming video clock until the FIFO buffer 62 is full.

Figure 5:
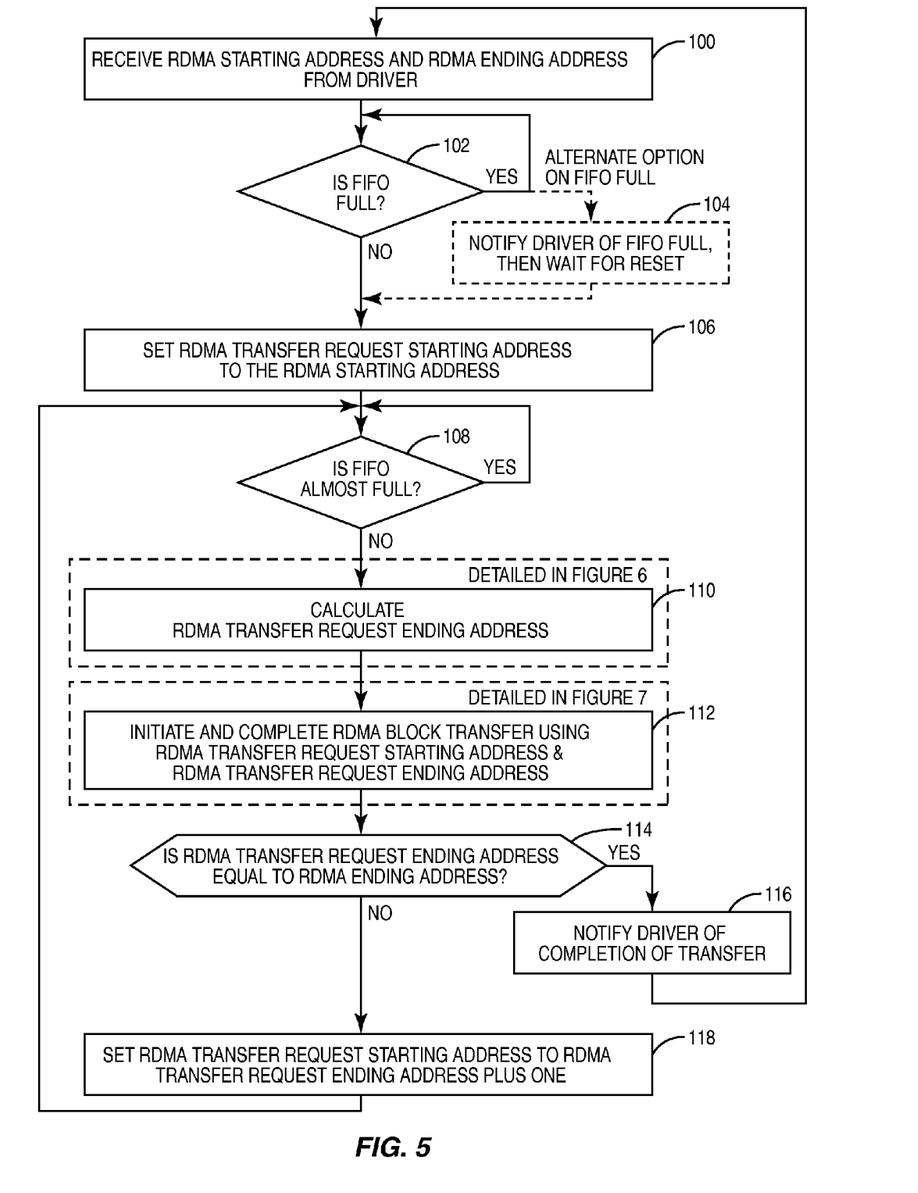
FIG. 5 is a flow chart illustrating the operation of the RDMA enabled FIFO buffer circuit of FIG. 4 according to one embodiment of the present invention.

FIG. 5 is a flow chart illustrating the operation of the RDMA data mover function 64 according to one embodiment of the present invention. First, the RDMA data mover function 64 receives an RDMA starting address and an RDMA ending address from the driver 32 (step 100). The RDMA starting address and the RDMA ending address define the RDMA address range for select video content hosted by the centralized media content server 12 (FIG. 1). As discussed above, when the viewer requests select video content, the driver 32 identifies the RDMA address range for the select video content using, for example, the mapping from the centralized media content server 12. Upon receiving the RDMA starting and ending addresses, the RDMA data mover function 64 determines whether the FIFO buffer 62 is full (step 102). In one embodiment, if the FIFO buffer 62 is full, the RDMA data mover function 64 continues to monitor the status of the FIFO buffer 62 until the FIFO is no longer full. In another embodiment, the RDMA data mover function 64 notifies the driver 32 that the FIFO buffer 62 is full and then waits for the driver 32 to reset, or clear, the FIFO buffer 62 (step 104).

If the FIFO buffer 62 is not full, or alternatively after the FIFO buffer 62 has been reset, the RDMA data mover function 64 sets a starting address for an RDMA transfer request to the RDMA starting address of the RDMA address range for the select video content (step 106). The RDMA data mover function 64 then determines whether the FIFO buffer 62 is almost full (step 108). If the status of the FIFO buffer 62 is almost full, the RDMA data mover function 64 waits until a sufficient amount of data has been clocked out of the FIFO buffer 62 to reduce the status of the FIFO buffer 62 below almost full. The RDMA data mover function 64 then calculates an ending address for the RDMA transfer request based on an amount of space available in the FIFO buffer 62, as discussed below in detail (step 110). In the typical scenario, the FIFO buffer 62 is not large enough to store all of the select video content. As such, the RDMA data mover function 64 sets the ending address for the RDMA transfer request based on a determination of the amount of space available in the FIFO buffer 62 or, in other words, a determination of the largest data block size that can be guaranteed to fit into the FIFO buffer 62.

Once the starting address and ending address for the RDMA transfer request are set, the RDMA data mover function 64 initiates and completes an RDMA transfer using the RDMA transfer request (step 112). More specifically, the RDMA data mover function 64 initiates the RDMA transfer by providing the RDMA transfer request to the RDMA layer 44 of the RDMA enabled network interface 34 (FIG. 2). Thereafter, the RDMA data mover function 64 completes the RDMA transfer by programming the RDMA address compare function 66 (FIG. 4) with the next anticipated RDMA address values such that the data received in response to the RDMA transfer request is stored in the FIFO buffer 62.

Once the RDMA transfer is complete, the RDMA data mover function 64 determines whether the ending address for the RDMA transfer request is equal to the RDMA ending address for the RDMA address range for the select video content (step 114). If so, the RDMA data mover function 64 notifies the driver 32 that the RDMA transfer is complete (step 116), and the process returns to step 100. If not, the RDMA data mover function 64 sets a starting address for a next RDMA transfer request to the ending address of the RDMA transfer request plus one (step 118), and the process returns to step 108. The process is repeated until the transfer of the entire RDMA address range for the select video content is complete or until the RDMA transfer is terminated as a result of, for example, the viewer selecting new video content for playback.

Figure 6:
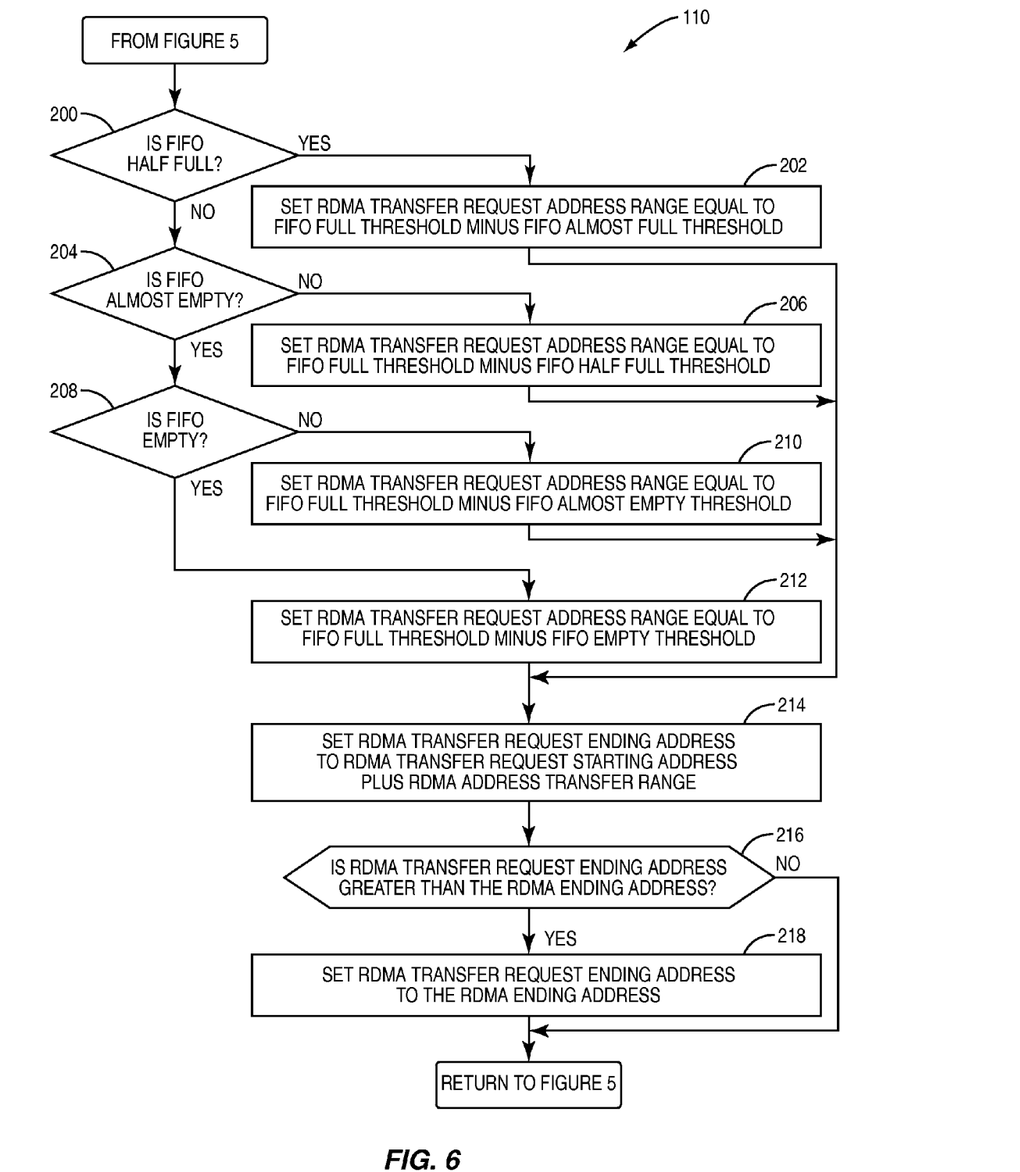
FIG. 6 is a more detailed illustration of one step of the process illustrated in FIG. 5 according to one embodiment of the present invention.

FIG. 6 is a more detailed illustration of step 110 of FIG. 5 according to one embodiment of the present invention. In order to calculate the ending address for the RDMA transfer request, the RDMA data mover function 64 first determines whether the status of the FIFO buffer 62 is half full (step 200). If so, the actual amount of data stored in the FIFO buffer 62 is in the range between the half full threshold setting and the almost full threshold setting of the FIFO buffer 62. As such, the RDMA data mover function 64 sets the range of the RDMA transfer request, or size of the segment to be transferred by the RDMA transfer request, equal to the full threshold setting of the FIFO buffer 62 minus the almost full threshold setting of the FIFO buffer 62 (step 202). The process proceeds to step 214. If the FIFO buffer 62 is not half full, the RDMA data mover 64 then determines whether the status of the FIFO buffer 62 is almost empty (step 204). If not, the amount of data stored in the FIFO buffer 62 is between the almost empty threshold setting and the half full/empty threshold setting. As such, the RDMA data mover function 64 sets the range of the RDMA transfer request, or size of the segment to be transferred by the RDMA transfer request, equal to the full threshold setting of the FIFO buffer 62 minus the half empty/full threshold setting of the FIFO 6 buffer 2 (step 206). The process then proceeds to step 214. If the FIFO buffer 62 is almost empty, the RDMA data mover 64 then determines whether the status of the FIFO buffer 62 is empty (step 208). If not, the amount of data stored in the FIFO buffer 62 is between the empty threshold setting and the almost empty threshold setting. As such, the RDMA data mover function 64 sets the range of the RDMA transfer request, or size of the segment to be transferred by the RDMA transfer request, equal to the full threshold setting of the FIFO buffer 62 minus the almost empty threshold setting of the FIFO buffer 62 (step 210). The process then proceeds to step 214. If the FIFO buffer 62 is empty, the RDMA data mover function 64 sets the range of the RDMA transfer request, or size of the segment to be transferred by the RDMA transfer request, equal to the full threshold setting of the FIFO buffer 62 minus the empty threshold setting of the FIFO buffer 62, which is preferably the full size or substantially the full size of the FIFO buffer 62 (step 212). The process then proceeds to step 214.

At this point, the RDMA data mover function 64 sets the ending address of the RDMA transfer request to a value equal to the starting address of the RDMA transfer request plus the range of the RDMA transfer request determined in steps 200-212 (step 214). The RDMA data mover function 64 then determines whether the ending address for the RDMA transfer request is greater than the RDMA ending address for the RDMA address range for the select video content (step 216). If not, the process proceeds to step 112 of FIG. 5. If so, the RDMA data mover function 64 sets the ending address of the RDMA transfer request to the RDMA ending address for the RDMA address range for the select video content (step 218), and the process then proceeds to step 112 of FIG. 5.

Figure 7:
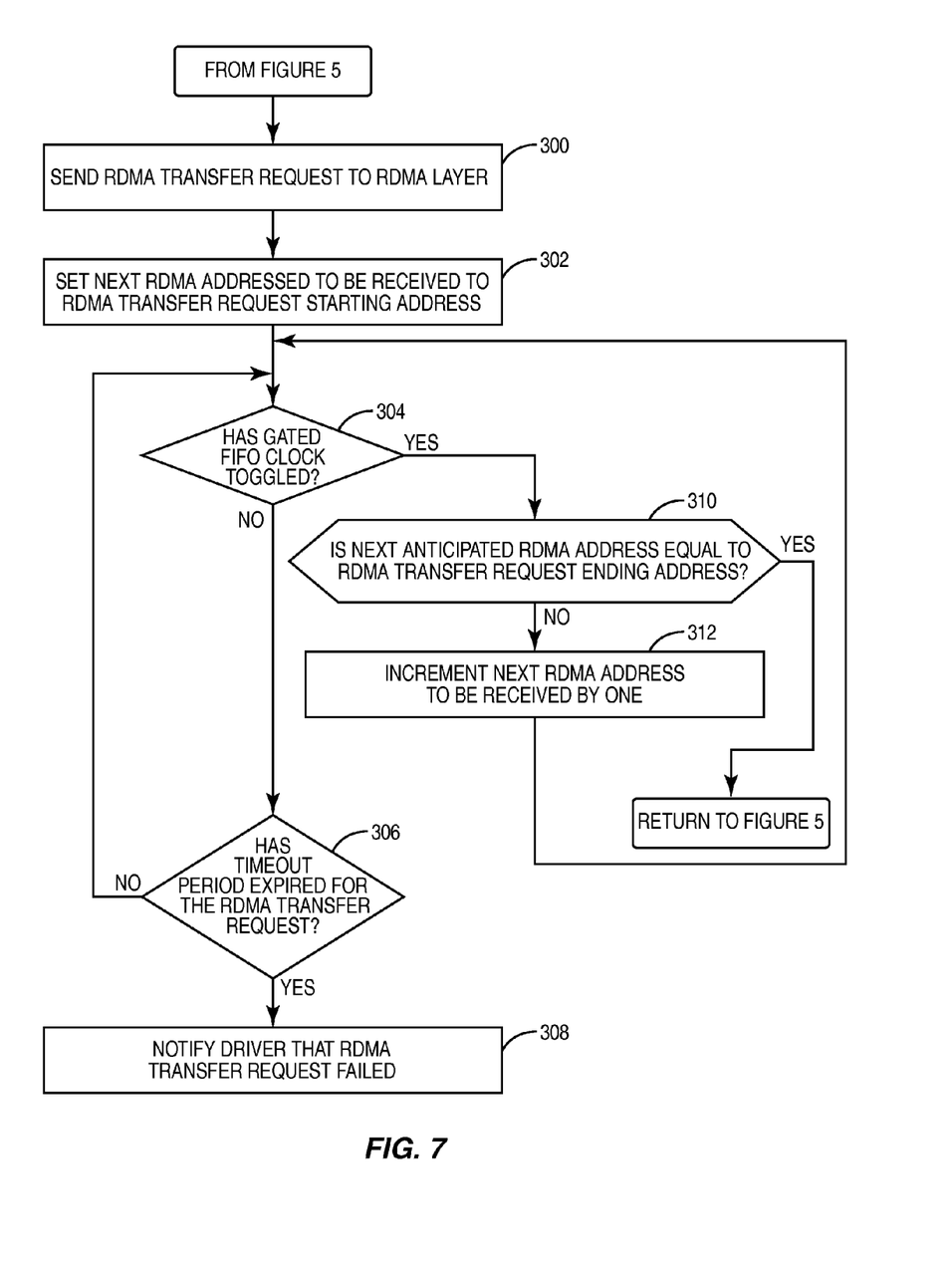
FIG. 7 is a more detailed illustration of another step of the process illustrated in FIG. 5 according to one embodiment of the present invention.

FIG. 7 is a more detailed illustration of step 112 of FIG. 5 according to one embodiment of the present invention. In order to initiate and complete the RDMA transfer request, the RDMA data mover function 64 first sends the RDMA transfer request to the RDMA layer 44 (FIG. 2) of the RDMA enabled network interface 34 (step 300). The RDMA data mover function 64 then sets the next anticipated RDMA address to the starting address of the RDMA transfer request (step 302). As discussed above, the RDMA address compare function 66 compares the next anticipated RDMA address to the RDMA address of data received from the RDMA layer 44. Since two or more of the RDMA enabled FIFO buffer circuits 56-1 through 56-X may be concurrently requesting RDMA data, the RDMA address compare function 66 ensures that only data received in response to the RDMA transfer request issued by the RDMA data mover function 64 is clocked into the FIFO buffer 62.

The RDMA data mover function 64 then monitors the gated FIFO input clock output by the RDMA address compare function 66 to determine whether the gated FIFO input clock has toggled (step 304). Note that the gated FIFO input clock is toggled by the RDMA address compare function 66 in response to receiving an RDMA address that is equal to the next anticipated RDMA address for the transfer in order to clock the corresponding data into the FIFO buffer 62. If the gated FIFO input clock has not toggled, the RDMA data mover function 64 determines whether a timeout period has expired for the RDMA transfer request (step 306). If so, the RDMA data mover function 64 notifies the driver 32 that the RDMA transfer request has failed (step 308). If the timeout period has not expired, the process returns to step 304.

Once the gated FIFO input clock has toggled to clock the data for the next anticipated RDMA address into the FIFO buffer 62, the RDMA data mover function 64 determines whether the next anticipated RDMA address, which is the RDMA address of the data just clocked into the FIFO buffer 62, is equal to the ending address of the RDMA transfer request (step 310). If so, the process proceeds to step 114 of FIG. 5. If not, the RDMA data mover function 64 increments the next anticipated RDMA address to be received by one (step 312). At this point, the process returns to step 304 and is repeated until the RDMA transfer is complete.

Figure 8:
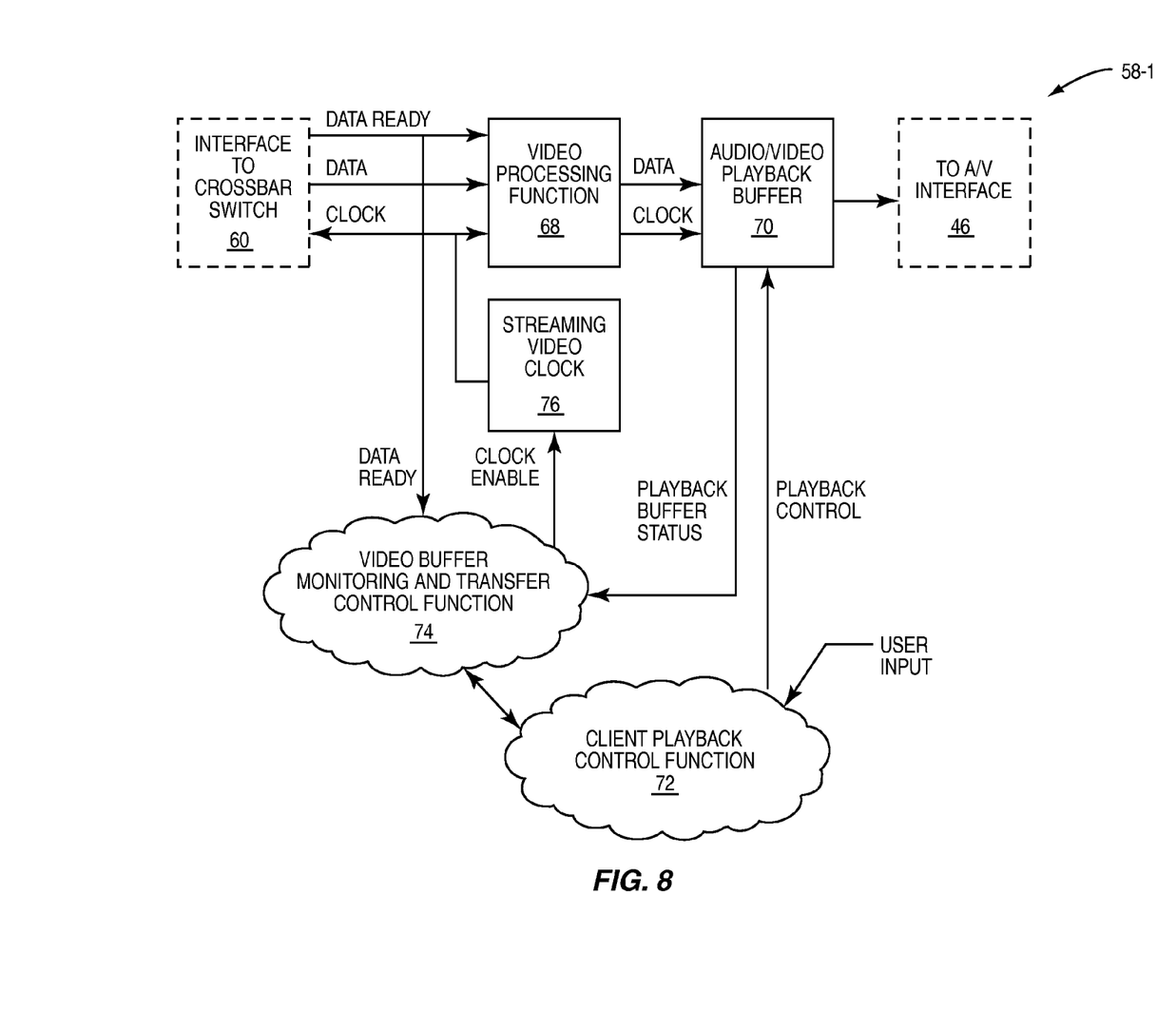
FIG. 8 is a block diagram of one of the playback buffer circuits of FIG. 3 according to one embodiment of the present invention.

FIG. 8 is a block diagram of the playback buffer circuit 56-1 according to one embodiment of the present invention. This discussion is equally applicable to the other playback buffer circuits 56-2 through 56-Y. In this embodiment, the playback buffer circuit 56-1 includes a video processing function 68 and an A/V playback buffer 70 controlled by a client playback control function 72 and a video buffer monitoring and transfer control function 74. The video processing function 68 is optional and may be implemented in hardware, software, or a combination thereof. In one embodiment, the video processing function 68 may perform operations such as decoding and decompressing the video content received from the RDMA enabled FIFO buffer circuit 56-1, 56-X to which it is connected via the crossbar switch 60 such that the video content is ready for presentation without additional delay. In addition or alternatively, if PIP or some similar feature is supported, the video processing function 68 may receive data from two or more of the RDMA enabled FIFO buffer circuits 56-1 through 56-X and process the data to provide the PIP or similar feature. The A/V playback buffer 70 is any type of buffer suitable for storing the video content from the video processing function for presentation to the one or more viewers via the A/V interface 46. Note that the A/V playback buffer 70 may include any control circuits needed or desired to enable playback control features such as rewinding, pausing, fast-forwarding, or the like.

The client playback control function 72 may be implemented in software, hardware, or a combination thereof. For example, the client playback control function 72 may be implemented as a software application stored by the controller 52 (FIG. 2). The video buffer monitoring and transfer control function 74 may be implemented in software, hardware, or a combination thereof. For example, if the STB function 14-1 is a set-top box, the video buffer monitoring and transfer control function 74 may be implemented as an Open Cable Application Platform (OCAP) application.

The video buffer monitoring and transfer control function 74 generally operates to manage a streaming video clock 76 based on the status of the A/V playback buffer 70 and/or requests from the client playback control function 72. The streaming video clock 76 is provided to clock data out of the FIFO buffer 62 of the connected RDMA enabled FIFO buffer circuit 56-1, 56-X to the video processing function 68 via the crossbar switch 60 at a desired clock rate. The streaming video clock 76 may be enabled or disabled by the video buffer monitoring and transfer control function 74. For example, the streaming video clock 76 may be disabled when a user input has been received from the viewer requesting that playback be paused. More specifically, if the viewer sends a request to pause playback, the client playback control function 72 may relay the pause request to the video buffer monitoring and transfer control function 74. The video buffer monitoring and transfer control function 74 may then monitor the A/V playback buffer 70 to allow data to continue to be transferred to the A/V playback buffer 70 until, for example, the A/V playback buffer 70 is full. When the A/V playback buffer 70 is full, the video buffer monitoring and transfer control function 74 may disable the streaming video clock 76 to suspend the transfer of data from the RDMA enabled FIFO buffer circuit 56-1, 56-X until the A/V playback buffer 70 is no longer full as a result of, for example, the viewer resuming playback. Alternatively, the video buffer monitoring and transfer control function 74 may disable the streaming video clock 76 as soon as the pause request is received and subsequently re-enable the streaming video clock 76 when playback is resumed.

Figure 9:
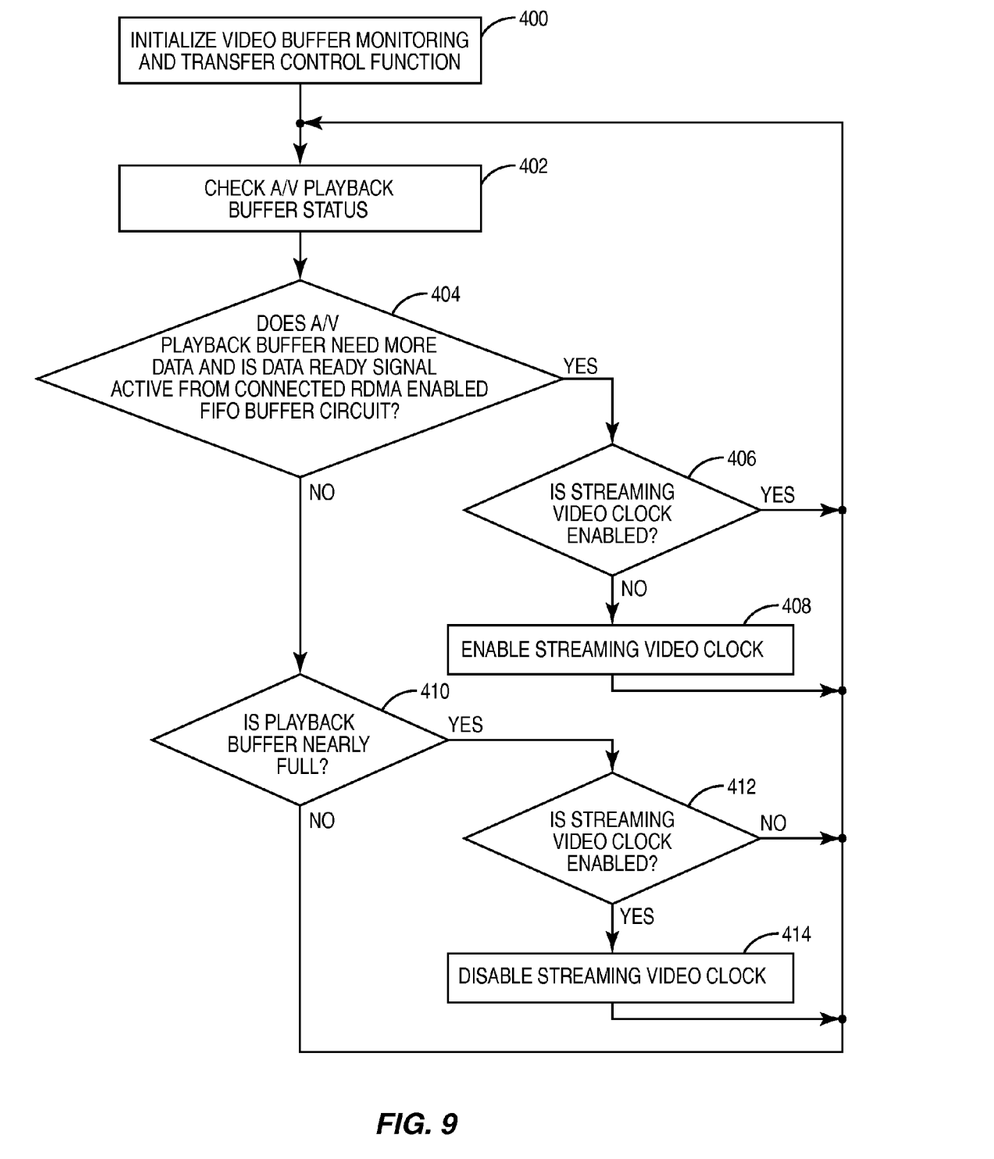
FIG. 9 is a flow chart illustrating the operation of the playback buffer circuit of FIG. 8 according to one embodiment of the present invention.

FIG. 9 illustrates the operation of the playback buffer circuit 58-1 of FIG. 8 according to one embodiment of the present invention. First, the client playback control function 72 initializes the video buffer monitoring and transfer control function 74 (step 400). The video buffer monitoring and transfer control function 74 then checks or otherwise obtains the status of the A/V playback buffer 70 (step 402). Next, the video buffer monitoring and transfer control function 74 determines whether the A/V playback buffer 70 needs more data and whether the data ready signal from the connected RDMA enabled FIFO buffer circuit 56-1, 56-X is active (step 404). If the A/V playback buffer 70 needs more data and the data ready signal is active, the video buffer monitoring and transfer control function 74 determines whether the streaming video clock 76 is enabled (step 406). If the streaming video clock is enabled, the process returns to step 402. If the streaming video clock 76 is not enabled, the video buffer monitoring and transfer control function 74 enables the streaming video clock 76 (step 408). The process then returns to step 402.

Note that upon enabling the streaming video clock 76, data begins to be clocked from the FIFO buffer 62 of the RDMA enabled FIFO buffer circuit 56-1, 56-X to which the playback buffer circuit 58-1 is connected via the crossbar switch 60. The data may be clocked from the FIFO buffer 62 as bits, bytes, words, or other appropriate format. Further note that additional circuitry may be used to perform serial to parallel data conversion, parallel to serial data conversion, or the like as needed or desired by the video processing function 68. As the data is clocked from the FIFO buffer 62, the video processing function 68 processes the data to provide the requested video content in a format ready for playback. The video content from the video processing function 68 is stored in the A/V playback buffer 70 for presentation to the one or more associated viewers via the A/V interface 46.

Returning to step 404, if the playback buffer does not need more data or if the data ready signal is not active, the video buffer monitoring and transfer control function 74 determines whether the A/V playback buffer 70 is nearly full (step 410). If not, the process returns to step 402. If so, the video buffer monitoring and transfer control function 74 determines whether the streaming video clock 76 is enabled (step 412). If not, the process returns to step 402. If so, the video buffer monitoring and transfer control function 74 disables the streaming video clock 76 (step 414), and the process returns to step 402.

The RDMA enabled playback circuitry 30 provides substantial opportunity for variation without departing from the spirit or scope of the present invention. For example, while the discussion above focuses primarily on video content, the present invention is not limited thereto. As another example, while the discussion above focuses on using the RDMA enabled playback circuitry 30 as part of a client architecture, the present invention is not limited thereto. More specifically, the RDMA enabled playback circuitry 30 may alternatively be implemented in a server or headend of a media content delivery system. In this alternative embodiment, each of the playback buffer circuits 58-1 through 58-Y may be allocated to a particular remote client device or a particular group of remote client devices. The RDMA enabled FIFO buffer circuits 56-1 through 56-X may be used to obtain media content for the playback buffer circuits 58-1 through 58-Y from a media content server via a LAN or WAN in a manner similar to that described above. The output of the playback buffer circuits 58-1 through 58-Y may then be delivered to the associated client devices via any type of delivery network such as, for example, an Internet Protocol (IP) based delivery network. Thus, as an example, the RDMA enabled playback circuitry 30 may be implemented as part of the multi-client streamer of U.S. patent application Ser. No. 11/760,013, entitled MULTI-CLIENT STREAMER WITH LATE BINDING OF AD CONTENT.

Those skilled in the art will recognize improvements and modifications to the preferred embodiments of the present invention. All such improvements and modifications are considered within the scope of the concepts disclosed herein and the claims that follow.

What is claimed is:

1. A system comprising:
   a network interface;
   playback circuitry associated with the network interface comprising:
   a first buffer circuit associated with the network interface and configured to:
   receive an address range of select media content defining a range of addresses in a storage unit of a media content server in which the select media content is stored; and
   perform at least one direct memory access transfer via the network interface to transfer data stored in the address range from the storage unit of the media content server to the first buffer circuit; and
   a second buffer circuit associated with the first buffer circuit comprising:
   a media content processing function configured to:
   receive the data from the first buffer circuit based on a playback rate;
   process the data to provide the select media content in a format ready for playback; and
   store the select media content for playback.

2. The system of claim 1 wherein the first buffer circuit comprises:
   a first buffer; and
   a data mover function configured to receive the address range of the select media content and perform the at least one direct memory access transfer via the network interface to transfer the data stored in the address range from the storage unit of the media content server to the first buffer.

3. The system of claim 2 wherein in order to perform the at least one direct memory access transfer, the data mover function is further configured to:
   generate a first direct memory access transfer request based on an amount of storage available in the first buffer;
   issue the first direct memory access transfer request to the network interface, wherein data received in response to the first direct memory access transfer request is stored in the first buffer.

4. The system of claim 3 further comprising:
   a plurality of first buffer circuits comprising the first buffer circuit, wherein the first buffer circuit further comprises an address compare function configured to:
   compare addresses of data received from the network interface in response to direct memory access transfer requests from the plurality of first buffer circuits to addresses requested by the first direct memory access transfer request to identify the data received in response to the first direct memory access transfer request; and trigger storage of the data received in response to the first direct memory access transfer request in the first buffer.

5. The system of claim 3 wherein in order to generate the first direct memory access transfer request, the data mover function is further configured to set a starting address of the first direct memory access transfer request to a first address in the address range of the select media content.

6. The system of claim 5 wherein in order to generate the first direct memory access transfer request, the data mover function is further configured to set an ending address of the first direct memory access transfer request to the starting address of the first direct memory access transfer request plus a value determined based on the amount of storage available in the first buffer.

7. The system of claim 3 wherein the first direct memory access transfer request is for a first block of the address range determined based on the amount of storage available in the first buffer, and in order to perform the at least one direct memory access transfer, the data mover function is further configured to:
generate a subsequent direct memory access transfer request to transfer a subsequent block of the address range when sufficient storage becomes available in the first buffer;
issue the subsequent direct memory access transfer request to the network interface, wherein data received in response to the subsequent direct memory access transfer request is stored in the first buffer.

8. The system of claim 7 wherein in order to perform the at least one direct memory access transfer, the data mover function is further configured to continue to generate subsequent direct memory access transfer requests to transfer subsequent blocks of the address range when sufficient storage becomes available in the first buffer and issue the subsequent direct memory access transfer requests to the network interface until transfer of the address range is complete.

9. The system of claim 1 further comprising:
a plurality of first buffer circuits including the first buffer circuit;
a plurality of second buffer circuits including the second buffer circuit; and
controllable switching circuitry configured to interconnect the plurality of first buffer circuits to the plurality of second buffer circuits in a desired manner.

10. The system of claim 9 further comprising a control function configured to:
receive user input identifying the select media content;
assign the select media content to the first buffer circuit of the plurality of first buffer circuits;
identify the second buffer circuit from the plurality of second buffer circuits to be used for playback of the select media content; and
control the controllable switching circuitry to interconnect the first buffer circuit to the second buffer circuit.

11. The system of claim 1 wherein the second buffer circuit further comprises a clock generation function configured to provide a playback clock.

12. The system of claim 11 wherein the clock generation function is controlled based on user input controlling playback of the select media content.

13. The system of claim 1, wherein the network interface and the playback circuitry are in a set top box.

14. The system of claim 1, wherein the network interface and the playback circuitry are in a server.

15. The system of claim 1, wherein the network interface and the playback circuitry are in a head end of a media content delivery system.

16. A method comprising:
performing at least one direct memory access transfer via a network interface to transfer data stored in an address range for select media content from a storage unit of a media content server to a first buffer circuit; and
transferring the data from the first buffer circuit to a second buffer circuit based on a playback rate;
processing the data to provide the select media content in a format ready for playback; and
storing the data to enable playback of the select media content.

17. The method of claim 16 wherein performing the at least one direct memory access transfer comprises:
generating a first direct memory access transfer request based on an amount of storage available in a first buffer of the first buffer circuit;
issuing the first direct memory access transfer request via the network interface;
receiving data in response to the first direct memory access transfer request; and
storing the data received in response to the first direct memory access transfer request in the first buffer of the first buffer circuit.

18. The method of claim 17 wherein receiving the data in response to the first direct memory access transfer request comprises:
receiving data in response to a plurality of direct memory access transfer requests comprising the first direct memory access transfer request issued by a plurality of first buffer circuits comprising the first buffer circuit;
comparing addresses of the data received in response to the plurality of direct memory access transfer requests to addresses of the first direct memory access transfer request to identify the data received in response to the first direct memory access transfer request; and
triggering storage of the data received in response to the first direct memory access transfer request in the first buffer of the first buffer circuit.

19. The method of claim 17 wherein generating the first direct memory access transfer request comprises setting a starting address of the first direct memory access transfer request to a first address in the address range of the select media content.

20. The method of claim 17 wherein the first direct memory access transfer request is for a first block of the address range determined based on the amount of storage available in the first buffer of the first buffer circuit, and performing the at least one direct memory access transfer further comprises:
generating a subsequent direct memory access transfer request to transfer a subsequent block of the address range when sufficient storage becomes available in the first buffer of the first buffer circuit;
issuing the subsequent direct memory access transfer request via the network interface;
receiving the data in response to the subsequent direct memory access transfer request; and
storing the data received in response to the subsequent direct memory access transfer request in the first buffer of the first buffer circuit.

21. The method of claim 20 wherein performing the at least one direct memory access transfer further comprises continuing to generate subsequent direct memory access transfer requests to transfer subsequent blocks of the address range when sufficient storage becomes available in the first buffer of the first buffer circuit and to issue the subsequent direct memory access transfer requests to the network interface until transfer of the address range is complete.

22. The method of claim 16 wherein the first buffer circuit is one of a plurality of first buffer circuits and the second buffer circuit is one of a plurality of second buffer circuits, and the method further comprises interconnecting the first buffer circuit to the second buffer circuit via switching circuitry.

23. A computer program product stored on a non-transitory computer-readable storage medium and including instructions configured to cause a processor to carry out the steps of:
performing at least one direct memory access transfer via a network interface to transfer data stored in an address range for select media content from a storage unit of a media content server to a first buffer circuit;
transferring the data from the first buffer circuit to a second buffer circuit based on a playback rate;
processing the data to provide the select media content in a format ready for playback; and
storing the data to enable playback of the select media content.

24. A system comprising:
a media content server;
a network interface;
playback circuitry associated with the network interface comprising:
a first buffer circuit associated with the network interface and configured to:
receive an address range of select media content defining a range of addresses in a storage unit of the media content server in which the select media content is stored; and
perform at least one direct memory access transfer via the network interface to transfer data stored in the address range from the storage unit of the media content server to the first buffer circuit; and
a second buffer circuit associated with the first buffer circuit comprising:
a media content processing function configured to:
receive the data from the first buffer circuit based on a playback rate;
process the data to provide the select media content in a format ready for playback; and
store the select media content for playback.

25. The system of claim 24, wherein the network interface and the playback circuitry are in a set top box.

26. The system of claim 24, wherein the network interface and the playback circuitry are in a server.

27. The system of claim 24, wherein the network interface and the playback circuitry are in a head end of a media content delivery system.

28. The system of claim 24, wherein the media content server is located in a head end of a media content delivery system.

* * * * *